United States Patent
Sandenburgh

[15] 3,643,916
[45] Feb. 22, 1972

[54] BALL VALVE AND PIPE FLANGE ASSEMBLY

[72] Inventor: George R. Sandenburgh, Wapping, Conn.
[73] Assignee: Contromatics Corporation, Rockville, Conn.
[22] Filed: May 29, 1969
[21] Appl. No.: 829,078

[52] U.S. Cl. .............................. 251/151, 251/315, 251/368
[51] Int. Cl. ...................................................... F16k 5/06
[58] Field of Search ............... 251/148, 151, 152, 315, 368

[56] References Cited

UNITED STATES PATENTS

| | | | |
|---|---|---|---|
| 3,096,965 | 7/1963 | Margus et al. | 251/315 X |
| 3,182,952 | 5/1965 | Montesi | 251/315 X |
| 3,202,175 | 8/1965 | Damm | 251/315 X |
| 3,245,655 | 4/1966 | Oetjens | 251/315 |
| 3,476,356 | 11/1969 | Scaramucci | 251/151 |

*Primary Examiner*—William R. Cline
*Attorney*—Robert S. Smith, David S. Urey, Alan C. Rose and Alfred B. Levine

[57] ABSTRACT

A ball valve assembly is described in which the end pieces are made of two separate pieces rather than being single integral members. Each end piece comprises a cylindrical insert made of a corrosion-resistant material having an end thereof secured in an abutting relationship with the valve body by a flange member made of a powdered metal or a casting or forging of a metal less precious than the cylindrical insert. Each cylindrical insert has an annular projection around the exterior surface thereof which mates with an annular groove in the opening in the flange member which receives the cylindrical insert, and the annular projection on the insert has a machined indent which matches with a corresponding projection in the flanged member to prevent rotation of the insert with respect to the flange member.

5 Claims, 5 Drawing Figures

PATENTED FEB 22 1972 3,643,916
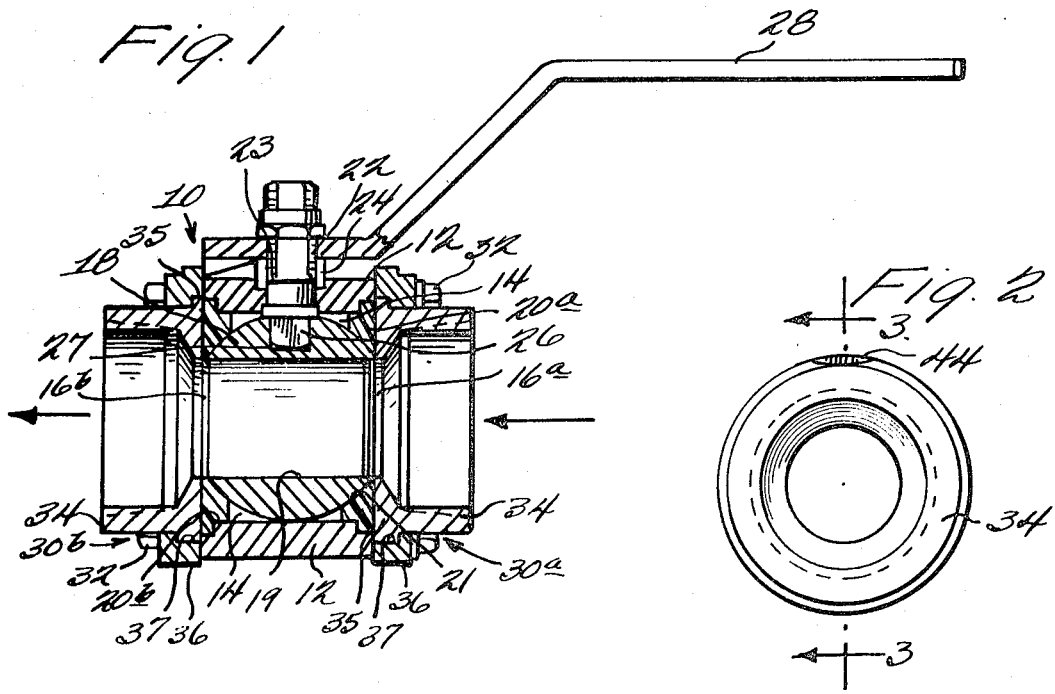
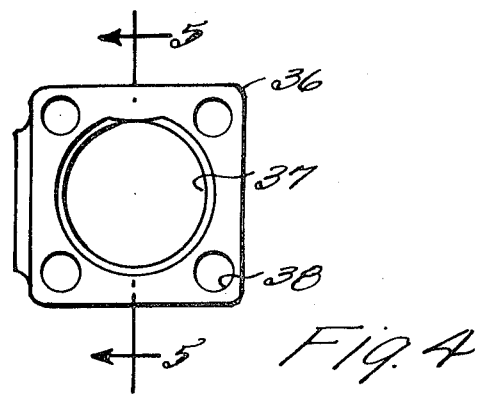
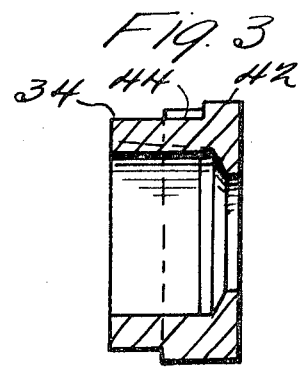
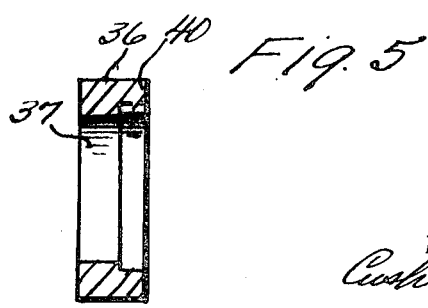
INVENTOR
GEORGE R. SANDENBURGH
BY
Cushman, Darby & Cushman
ATTORNEYS

BALL VALVE AND PIPE FLANGE ASSEMBLY

This invention relates to ball valves, or valves which use a spherical member having a lateral bore therethrough and which are rotatable to control the flow of a liquid through a pipeline of which the ball valve is a part.

A principle problem area in the design of valves, or similar parts, which must be used in significant numbers is to be able to maintain or reduce the cost of manufacture of such parts. It is desirable, therefore, to be able to take advantage of those fabrication processes which will result in cost reduction, while not degrading the performance of structural integrity of the finished product. In the case of metal parts used in ball valves these must generally be machined or wrought from corrosion-resistant materials. If suitable techniques were found, however, and a suitable ball valve were evolved, portions of the ball valve so designed would perform only structural functions, not coming into contact with the controlled liquid, and these could be fabricated at a reduced cost using less expensive materials and/or fabrication methods. Furthermore, in seeking out new manufacturing techniques it is desirable to utilize those new techniques which will result in an improved product. In particular in the case of ball valves or like elements a principle way of improving the performance of such elements would be to reduce the leakage therefrom in response to increased pressures.

It is therefore an object of this invention to provide an improved ball valve which may be manufactured at a reduced cost without degrading the performance characteristics or the structural integrity of the valve.

Another object of this invention is to provide a ball valve manufactured at reduced cost which will withstand greater pressures with reduced leakage than those previously available.

A further object of this invention is to provide a ball valve meeting all of the aforementioned objects and in which those structural parts not in contact with the controlled liquid are made from compressed powdered metal as a forging of a metal less precious than the metal from which the parts in contact with the controlled liquid are constructed.

Still another object of this invention is to provide a method of fabrication of the end pieces of a ball valve in which those parts of the end piece which come into contact with the controlled liquid are machined or wrought from corrosion-resistant materials, but those parts of the end pieces which perform only structural functions are fabricated by less expensive means which will not degrade the performance characteristics or the structural integrity of the finished valve.

The aforementioned and other objects are obtained in a ball valve assembly in which the end pieces are constructed in two separate pieces. The cylindrical portion is machined from a corrosion-resistant material, and the flange member which secures the cylindrical member to the valve body is fabricated from compressed powdered metal. By constructing the end pieces in this manner, a significant reduction in manufacturing costs, on the order of from 30 percent to 60 percent may be realized. The performance of the valve is in no way degraded because the compressed powdered metal parts which are not corrosion resistant do not come into contact with the controlled liquid, and in fact the performance of the valve may be improved because the end pieces, being made of compressed metal, can be made thicker than the corresponding part in an integral end piece permitting the two-piece end piece to withstand increased fluid pressures without significant leakage. The performance of a ball valve constructed according to the principles of this invention in the latter respect is significantly better than those valves in which the end pieces comprising the cylindrical flow passage extension and flange member are formed as an integral part from the corrosion resistant material.

The principles of the invention may be best understood by reference to the specification hereinbelow and the drawings in which:

FIG. 1 is a side cross-sectional view of a preferred embodiment of an improved ball valve constructed according to the principles of this invention;

FIG. 2 is a front-elevational view of a preferred embodiment of the cylindrical insert member which forms a part of the end piece in the improved ball valve constructed according to the principles of this invention;

FIG. 3 is a side cross-sectional view of the member illustrated in FIG. 2;

FIG. 4 is a front-elevational view of a preferred embodiment of the flange portion of the end piece in the improved ball valve constructed according to the principles of this invention; and FIG. 5 is a side cross-sectional view of the element illustrated in FIG. 4.

Referring to FIG. 1 there is shown an improved ball valve 10 constructed according to the principles of this invention. In this side cross-sectional view of the ball valve the ball is shown as having been rotated to a position which will allow fluid to flow through the valve. A substantially cylindrical valve body 12 which may be made of bronze or a like corrosion-resistant material is provided having an interior chamber 14 in which the valve ball will be mounted. In addition, the valve body defines flow passages 16a and 16b extending from each end thereof. The flow through the valve is controlled by a valve ball 18 which is rotatably mounted in the chamber of valve body 12. A lateral bore 19 through the ball permits the flow of fluid therethrough. The ball 18 may be rotated so that the bore 19 is substantially perpendicular to the flow path through the valve. In this position the substantially spherical surfaces of the ball will cooperate with the interior circumferential edges of the valve body which define the valve chamber to block fluid flow through the valve.

Valve seats 20a and 20b are provided for encircling the openings into the chamber defined by the end edges of valve body 12. When the ball 18 is rotated so that it has closed the valve, valve seats 20a and 20b serve to seal the area between the ball and the valve body and prevent leakage therethrough. The inner surfaces 21 of valve seats 20a and 20b are shaped so that they slightly extend around the surface of the ball for more effective sealing. Therefore, these valve seats must be made of a material which will provide a surface that will allow the ball to slide freely therepast. Such a material would be a yieldable polymeric material, for example, polytetrafluoroethylene, sold commercially under the trademark Teflon.

In order to control the rotational position of valve ball 18 a shaft 22 is extended down through the upper wall of valve body 12 and is received by the ball. The shaft 22 extends through a gland ring 23 and seals 24 which serve to prevent leakage through the opening provided in the valve body for the shaft. The end of shaft 22 received by the valve ball 18 is a flattened tang 26 on the inner end of the shaft, and the flattened tang 26 fits slidably into a cooperating slot 27 formed in the ball. The slot 27 in the valve ball is of a size that when the ball is turned to its closed position, the ball is free to float or move under the differential force of fluid pressure on the ball toward the valve seat 20b on the downstream side of the valve providing a more effective seal at that part of the valve. The protruding end of the valve shaft 22 may be inserted into a handle 28, the handle being held in place by a shaft nut to provide a means for rotating the shaft and thereby rotating the valve ball.

Valve end pieces, indicated generally as 30a and 30b, are provided for securing the valve body, valve seats and the valve ball in their assembled relationship by exerting inward pressure forces on the valve seats when the two opposing end pieces are bolted together by bolts 32 which extend therebetween. Furthermore, these end pieces provide extensions of the flow passages from the valve body and may provide a means for threadably connecting the valve to external piping. These end pieces in prior art devices are single integral elements which have a square-shaped flange and a cylindrical boss to accommodate machining of the desired type end connection. The prior art end pieces are made of a single corrosion-resistant material, because the cylindrical boss portion will come into contact with the liquid being controlled. Therefore, the material which must be used in these prior art end pieces must be bronze or a like corrosion-resistant material, and these materials generally require relatively expensive machining techniques to fabricate the desired part.

The end pieces 30a and 30b constructed according to the principles of this invention each consist of two separate elements. A cylindrical insert 34 is provided for each end piece for forming the extension of the flow passages to which external piping may be attached. The cylindrical insert must be made from bronze or a like material which is corrosion resistant because this element will come in contact with the liquid being controlled. An end 35 of the cylindrical insert, when assembled on the ball valve abuts the valve body and valve seat, and an annular projection 42 extending upwardly from the exterior surface of the cylindrical insert is provided for engaging with an annular groove 40, to be described, in the flange member 36 of the end pieces. The annular projection 42 on each cylindrical insert 34 is provided with an arcuate machined indent 44. This indent will mate with a projection in flange member 36, to be described below, to prevent rotation of the cylindrical insert with respect to the flange.

The flange member 36 which is generally square shaped has a circular opening extending through the thickness thereof to receive cylindrical insert 34. In addition, four holes 38 are provided at the corners of each of the flange members so that when assembled on the ball valve four bolts extending through aligned holes of the flange members will secure the end pieces 30a and 30b to the valve body. In the interior portions of the circular openings through the flange members an annular groove 40 is provided for engaging with the annular projection 42 on the cylindrical insert 34. A convex projection 46 is provided in annular groove 40 for mating with the indented portion 44 on annular projection 42. The engagement of projection 46 with indentation 44 will prevent rotation of the cylindrical insert with respect to the flange member.

In discussing the two-piece construction of the valve end pieces hereinabove it will have become clear that the flange members 36 are merely structural elements which in no way act to come into contact with the liquid being controlled. Therefore, the flange members may be made of a material which need not be corrosion-resistant and which will lend itself to less extensive fabrication techniques. This, of course, is the principal reason for the two-piece construction of the valve end pieces 30a and 30b.

A most satisfactory method of fabricating the flange members 36 has been found using the techniques of powdered metal metallurgy. The flange members may be formed by placing metal particles in a die and compressing them under extreme pressures. When the compressed metal part is removed from the die, it will have the appearance of the finished part. In order to insure the strength of the part, however, it is necessary, after the compressing step, to fire the part in an oven to a fusing temperature. After the fusing step, the part constructed of powdered metal will have a strength nearly as great as a wrought part of the same material.

As an additional benefit of constructing the valve end pieces in the above-described manner, in addition to the significant reduction in cost, it has been found that these flange members can be made to withstand much greater pressures. This is made possible because the flange members constructed according to the principles of this invention can be economically made much thicker than can a flange which is a part of a one piece end piece. The latter flange which must be made of a precious, corrosion-resistant metal cannot be made of a sufficient thickness to produce a similar reduction in leakage without increasing costs so substantially as to make such construction impractical. Thus, there will be virtually no leakage between the end pieces made by utilizing this invention and the valve body when the valve is subjected to greater fluid pressures. For example, in a 1-inch ball valve with two-piece end pieces constructed according to the principles of this invention pressures of up to 4,000 pounds per square inch were withstood before leakage occurred. This may be constructed with 1-inch ball valve having end pieces which are integral elements constructed entirely of bronze and having correspondingly thinner flange members. In this latter case, the valve would withstand pressures of up to only 2,500 pounds per square inch before leakage occurred between the valve body and the end pieces.

The preferred embodiment described hereinabove is only exemplary, and it will be apparent to those skilled in the art that the structural elements thereof or their arrangement may be modified within the scope of the appended claims.

What is claimed is:

1. An improved ball valve assembly comprising in combination a valve body having flow passages extending from opposite ends thereof, said valve body defining an internal valve chamber communicating with said flow passages, a substantially spherical valve ball having a bore laterally therethrough and adapted to be rotatably mounted in said valve chamber, said flow passages and said bore defining a flow channel through said ball valve, a shaft means extending through said valve body and cooperating with said valve ball to rotate said valve ball from a position where said bore is aligned with said flow passages through a position where said body is transverse to said flow passages and the surfaces of said ball close said flow passages, valve set means encircling each of said flow passages forming fluidtight seals between the surfaces of said valve ball and said valve body and made of a material which will allow said valve ball to freely rotate therepast, a pair of cylindrical end members in end abutting relationship with said valve body and said valve seats, forming extensions of said flow passages, and a pair of flange members having circular openings therethrough engaging with said cylindrical end members, and a plurality of bolts engaging said flange members to urge on another together to secure said end members against said valve seats and said valve body thereby fixedly connecting said cylindrical end members to said valve body, said cylindrical end members further include an annular projection extending from the exterior surfaces thereof and wherein said flange members include annular grooves in said means defining said circular openings therein adapted to receive said cylindrical end members, said projections and said grooves adapted to be placed in engagement when said cylindrical end members are extended through said flange members.

2. The improved ball valve assembly defined in claim 2 wherein said annular projection includes an indented section and said annular groove includes a projection adapted to mate with said indented section for preventing rotation of said end members with respect to said flange members when said cylindrical end members are placed in an assembled relationship with said flange members.

3. An improved ball valve assembly comprising in combination a valve body having flow passages extending from opposite ends thereof, said valve body defining an internal valve chamber communicating with said flow passage, a substantially spherical valve ball having a bore laterally therethrough and adapted to be rotatably mounted in said valve chamber, said flow passages and said bore defining a flow channel through said ball valve, a shaft means extending through said valve body and cooperating with said valve ball to rotate said valve ball from a position where said bore is aligned with said flow passages through a position where said bore is transverse to said flow passages and the surfaces of said ball close said flow passages, valve seat means encircling each of said flow passages forming fluidtight seals between the surfaces of said valve ball and said valve body and made of a material which will allow said valve ball to freely rotate therepast, a pair of cylindrical end members in end abutting relationship with said valve body and said valve seats, forming extensions of said flow passage, and a pair of flange members having circular openings therethrough engaging with said cylindrical end members, and a plurality of bolts engaging said flange members to urge one another together to secure said end members against said valve seats and said valve body thereby fixedly connecting said cylindrical end members to said valve body, said flange members being made of compressed powdered metal.

4. The improved ball valve assembly defined in claim 4 wherein said cylindrical end members are made of a corrosion-resistant material.

5. A two-piece end piece for ball valves comprising a cylindrical member adapted to be placed at an end thereof in an abutting relationship with a valve body and forming an extension of a flow passage from said valve body, said cylindrical member having an annular projection extending from the exterior surface thereof near said abutting end, said annular projection having an indented section therein and a flange member made of compressed powdered metal for securing said cylindrical member to said valve body, said flange member having a circular opening therethrough for receiving said cylindrical member, said opening having an annular groove therearound in the interior surface thereof for receiving said annular projection, said annular groove having a projection extending therefrom and adapted to mate with said indented portion in said annular projection.

* * * * *